United States Patent Office 3,546,550
Patented Dec. 8, 1970

3,546,550
CONTROL CIRCUIT FOR BRAKING SPEED
CONTROL OF INDUCTION MOTOR
Jiří Bádal, Jan Holý, and Josef Parlesák, Prague,
Czechoslovakia, assignors to CKD Praha, oborovy
podnik, Prague, Czechoslovakia
Filed Mar. 24, 1969, Ser. No. 809,564
Claims priority, application Czechoslovakia,
Mar. 27, 1968, 2,348/68
Int. Cl. H02p 3/24
U.S. Cl. 318—212                    8 Claims

ABSTRACT OF THE DISCLOSURE

A converter connects an electrical power source to the stator winding of an induction motor via an auxiliary switch and applies to the motor a variable voltage from direct voltage to an alternating voltage of variable frequency. A control unit is connected to the converter via a regulator for regulating direct and alternating voltages to specific reference levels. The control unit controls the converter in accordance with specific operating conditions of the motor to apply direct voltage to the stator winding of the motor to brake the motor when it is operating at high speed and to apply a variable frequency voltage to the stator winding to brake the motor when it is operating at low speed.

DESCRIPTION OF THE INVENTION

The present invention relates to a control circuit for an induction motor. More particularly, the invention relates to a control circuit for braking speed control of an induction motor.

The control circuit of the present invention functions to provide efficient braking and accurate run-out of induction motors, particularly motors of the slip-ring type, by a combination of dynamic braking and frequency control.

Various methods are utilized to brake induction motors. The most important of these are reverse-current braking, dynamic braking and regenerative braking. Each of these methods has some basic shortcomings. Reverse-current braking produces high stator currents and is unsuitable where an accurate run-out or position control is required. Dynamic braking becomes inefficient at a low motor speed. The most reliable of these methods is regenerative braking under control at the supply frequency. A supply source for a full speed range is very expensive, however, and specific difficulties arise when high voltage machines are supplied via semiconductor converters. Shortcomings of the known methods are overcome, at least to a certain extent, by the control circuit of the present invention.

The principal object of the present invention is to provide a new and improved control circuit for an induction motor.

An object of the present invention is to provide a new and improved control circuit for braking speed control of an induction motor.

An object of the present invention is to provide a control circuit for braking speed control of an induction motor with efficiency, effectiveness and reliability.

In accordance with the present invention, a control circuit for braking speed control of an induction motor having a rotor and a stator winding comprises a main switch. A constant frequency source of electrical power is connected to the stator winding of the motor via the main switch. An auxiliary switch is operated with the main switch. A converter connects the electrical power source to the stator winding of the motor via the auxiliary switch to apply to the motor a variable voltage from direct voltage to an alternating voltage of variable frequency. A regulator comprises DC regulating means and frequency regulating means for regulating direct and alternating voltages to specific reference values. A control unit is connected to the converter via the regulator and controls the converter in accordance with specific operating conditions of the motor to apply direct voltage to the stator winding of the motor to brake the motor when it is operating at high speed and to apply a variable frequency voltage to the stator winding to brake the motor when it is operating at low speed.

A changeover switch may be interposed and connected between the motor and each of the converter and electrical power source. The changeover switch has a first selectable position in which it electrically connects the motor to the converter and disconnects the motor from the electrical power source and a second selectable position in which it electrically connects the motor to the electrical power source and disconnects the motor from the converter.

Electrical resistances are connected to the rotor winding of the motor to dynamically brake the motor. Short-circuit switches are connected to the resistances and are connected to and controlled by the control unit to selectively connect and disconnect the resistances to and from the motor.

A speed sensor is coupled to the motor and is electrically connected to the control unit to control the operation of the regulator in accordance with the speed of the motor. A position sensor is coupled to the motor and is electrically connected to the control unit to control the operation of the regulator in accordance with the position of the rotor of the motor.

The regulator comprises current regulating means having an output connected to the converter and a pair of inputs. A source of reference current has an output connected to the input of the current regulating means and a plurality of inputs. The current sensor is connected to the other input of the current regulating means for supplying a signal corresponding to the current supplied to the converter. One of the inputs of the reference current source is connected to the control unit.

A main switch control controls the position of the main switch. An auxiliary switch control controls the position of the auxiliary switch. A short-circuit switch control controls the position of the short-circuit switch. The control unit has a plurality of outputs each connected to a corresponding one of the main switch control, the auxiliary switch control and the short-circuit switch control for controlling the main switch, the auxiliary switch and the short-circuit switch in position.

The position sensor is electrically connected to both the control unit and another input of the reference current source of the regulator to control the operation of the regulator in accordance with the position of the rotor of the motor. The speed sensor is electrically connected to both the control unit and still another input of the reference current source of the regulator to control the operation of the regulator in accordance with the speed of the motor.

The control circuit of the present invention permits dynamic braking at high speed operation of the motor, because the converter may function as a DC source in one or a plurality of phases of the induction motor. During the final braking stage, when dynamic braking is no longer efficient, the converter changes from operating as a DC source and functions instead as a variable frequency voltage source. The converter may be connected to the stator winding or the rotor winding of the motor, whichever connection is more simple. In order to provide for matching of the voltage, however, the converter is more advantageously connected to the rotor winding of the motor.

In order to avoid a failure in operation of the converter, the main and auxiliary switches are operated with each other, as hereinbefore described. The converter may be connected, as desired, to a single phase source of electrical power or a three-phase or multiphase source of electrical power. The output voltage provided by the converter has the same number of phases as the winding of the motor or machine to be supplied. The connection of the motor to the source of electrical power is asymmetrical or has an extended transformer neutral point, and the neutral point of the transformer is connected to a neutral point on the induction motor winding. The circuitry may be simplified by connecting the converter to the stator winding of the motor. The main and auxiliary switches are then replaced by a single changeover switch, as hereinbefore described. At the same time, there is a mechanical prevention of interconnection of the source of electrical power with the output circuit of the converter.

The braking energy is usually absorbed by the hereinbefore described resistances connected to the stator winding. A voltage is induced in the resistances by a direct current field produced by the flow of direct current in the stator winding of the motor. The dynamic braking resistances may be utilized for starting the motor and are short-circuited by the aforedescribed short-circuit switch at normal operating speeds and upon the supplying of a variable frequency voltage.

The control unit and the regulator determine whether the induction motor has applied to it a direct voltage or a variable frequency alternating voltage from the converter, as hereinbefore described. The frequency regulator of the regulator is blocked by the control unit during high speed operation of the motor. Only the current regulator operates during high speed operation of the motor and controls the firing angles of a plurality of controlled rectifiers of the converter thereby controlling the magnitude of current flow through such rectifiers. The current regulator also controls the phases of the induction motor winding. Once the motor has attained a predetermined speed, the control unit automatically releases the frequency regulator for operation and the converter provides a variable frequency alternating voltage. The braking resistances are then simultaneously short-circuited. Thus, the dynamic braking resistances are switched into the circuit simultaneously with the connection of the motor to the electrical power source at the initiation of the braking, and are short-circuited, and thereby switched out of the circuit, when the dynamic braking is changed to regenerative braking, that is, when the frequency regulator commences operation. The control unit controls the operation of the various switches. During dynamic braking, the braking intensity is controlled, in accordance with the speed of operation of the motor, by the current regulator.

In order that the present invention may be readily carried into effect, it will now be described with reference to the accompanying drawings, wherein.

In the figures, the same components are identified by the same reference numerals.

Figure 1:
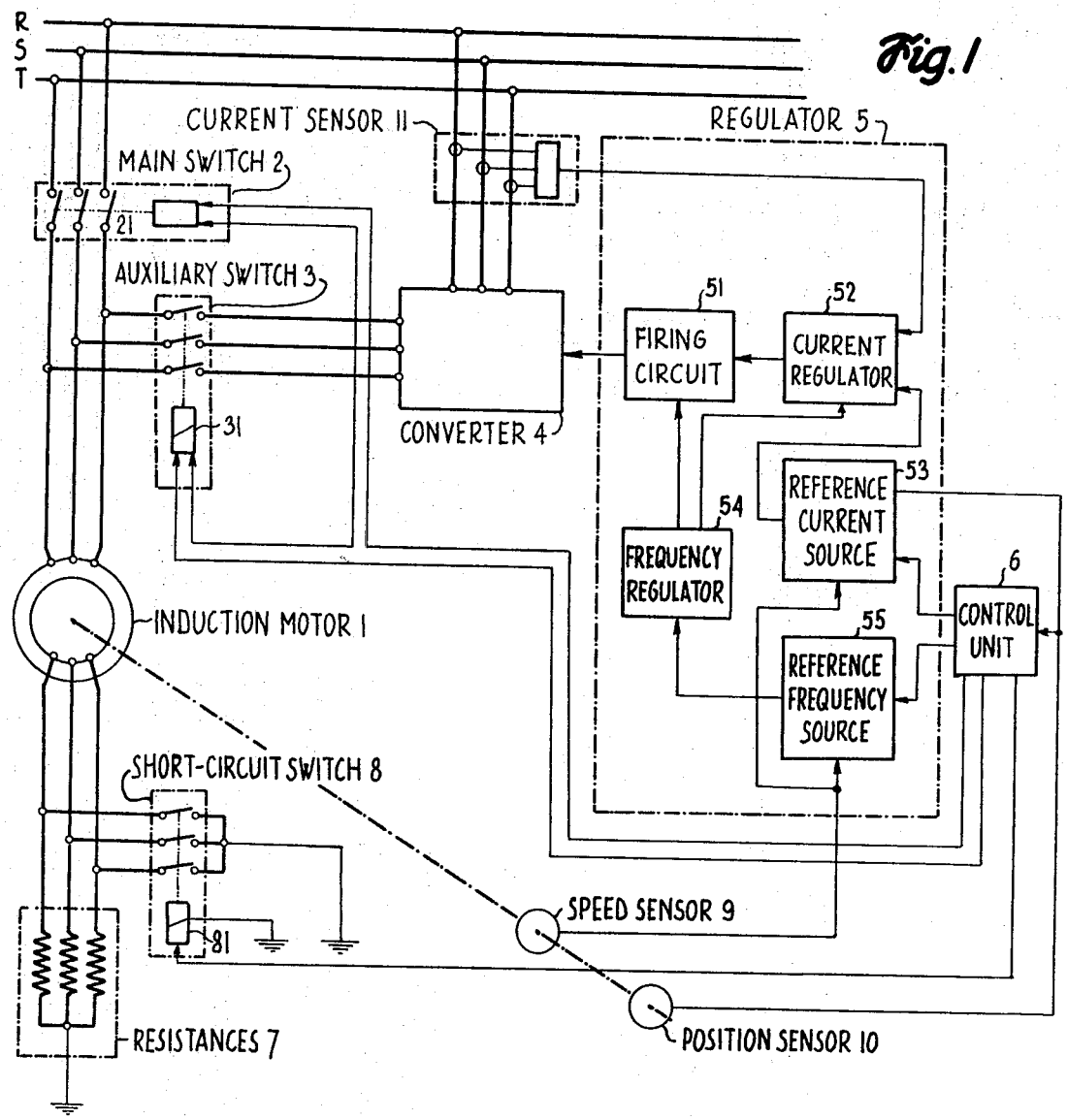
FIG. 1 is a block diagram of an embodiment of the control circuit of the present invention for braking speed control of an induction motor.

In FIG. 1, an induction motor 1 is connected to a constant frequency source R, S, T of electrical power via a main switch 2. The electrical power source R, S, T is connected to the stator winding of the induction motor 1 in FIG. 1. The electrical power source R, S, T is also connected to the stator winding of the induction motor 1 via an auxiliary switch 3 and a converter or cycloconverter 4. The converter 4 and the auxiliary switch 3 are connected in series with each other.

The main switch 2 is controlled by a main switch control unit 21. The auxiliary switch 3 is controlled by an auxiliary switch control unit 31. The main switch control unit 21 may comprise any suitable relay device for controlling the switch arms of the main switch 2 and is electrically connected to a control unit 6. The auxiliary switch control unit 31 may comprise any suitable relay device for controlling the switch arms of the auxiliary switch 3 and is electrically connected in series with the main switch control unit 21, to the control unit 6. The main switch 2 and the auxiliary switch 3 are so connected that they are operated together, so that if one of said switches is closed, the other is open.

A regulator 5 is connected between the control unit 6 and the converter 4. The regulator 5 comprises a firing circuit 51 having an output connected to the converter 4 and a pair of inputs. A current regulator 52 has an output connected to one of the inputs of the firing circuit 51 and three inputs. A reference current source 53 has an output connected to one of the inputs of the current regulator 52 and three inputs. A frequency regulator 54 has an output connected to the second input of the firing circuit 51, an output connected to a second input of the current regulator 52 and an input. A reference frequency source 55 has an output connected to the input of the frequency regulator 54 and a pair of inputs.

A plurality of resistances 7 for dynamic braking are connected to the rotor winding of the induction motor 1. The resistances 7 function to dynamically brake the motor 1. A short-circuit switch 8 is connected to the resistances 7 and is controlled by a short-circuit switch control unit 81. The short-circuit switch control unit 81 may comprise any suitable relay device for controlling the position of the switch arms of the short-circuit switch 8 and is electrically connected to the control unit 6.

A speed sensor 9, which may comprise any suitable speed sensing device, is coupled to the rotor of the motor 1 and is electrically connected to an input of the reference frequency source 55 of the regulator 5 and to one of the inputs of the reference current source 53 of said regulator. A position sensor 10, which may comprise any suitable position sensing device, is coupled to the rotor of the motor 1 and is electrically connected to the control unit and to another of the inputs of the reference current source 53 of the regulator 5. A current sensor 11, which may comprise any suitable current sensing device such as, for example, an ammeter, is connected between the electrical power source R, S, T and the third input of the current regulator 52 of the regulator 5.

The control unit 6 has one input and five outputs. The position sensor 10 is connected to the input of the control unit 6. A first output of the control unit 6 is connected to the third input of the reference current source 53 of the regulator 5. A second output of the control unit 6 is connected to the second input of the reference frequency source 55 of the regulator 5. The third and fourth outputs of the control unit 6 are connected to the main switch control unit 21 and the auxiliary switch control unit 3. The fifth output of the control unit 6 is connected to the short-circuit switch control unit 81. The control unit 6 may comprise any suitable control unit, having electronic switching means, for controlling the operation of the regulator 5 and the main, auxiliary and short-circuit switches 2, 3 and 8, respectively.

When the induction motor 1 operates at high speed, said motor is energized via the converter 4 through the auxiliary switch 3. The converter 4, which may comprise any suitable AC to DC and AC to AC converter, applies a DC voltage to the stator winding of said induction motor. The resistances 7 are then connected in circuit, since the short-circuit switch 8 is open, and provide dynamic braking of the motor 1.

When the speed of the induction motor 1 has been reduced to a desired extent, the speed sensor 9 indicates this fact and operates the regulator 5 to regulate the direct voltage to an alternating voltage of a specific reference level, the reference level varying with the speed. The regulator 5 thus controls the converter 4 to apply an alternating voltage of variable frequency to the induction motor 1 via the auxiliary switch 3 while said motor is operating at low speed. The control unit 6 then operates the short-circuit switch 8 to its closing position so that the resistances 7 are short-circuited and the induction motor 1 is further decreased in speed by regenerative braking.

Figure 2:
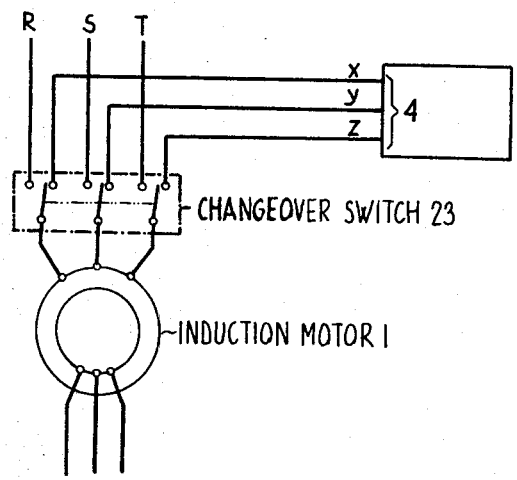
FIG. 2 is a block diagram of another embodiment of the switching portion of the control circuit of the present invention for braking speed control of an induction motor.
Figure 3:
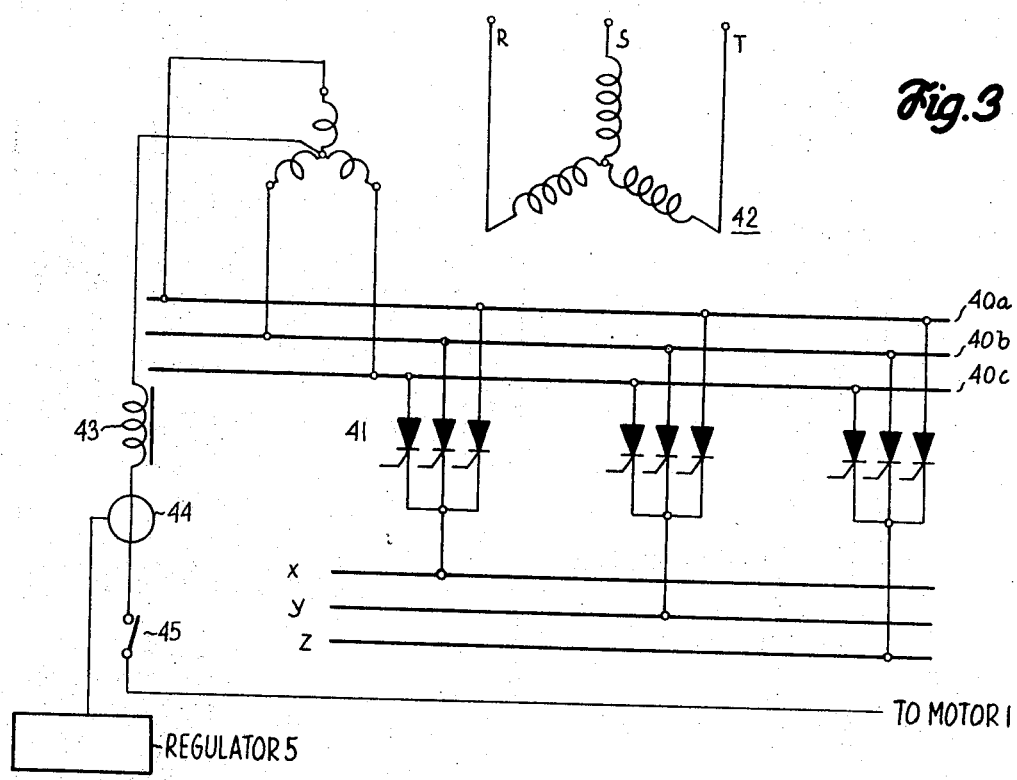
FIG. 3 is a circuit diagram of a three-phase power supply connection of the converter of the control circuit of the present invention for braking speed control of an induction motor.

After the completion of operation of the induction motor 1, upon the next operation of said motor, the control unit 6 initially operates the auxiliary switch 3 to open said switch and simultaneously operates the main switch 2 to close said switch. The main switch 2 remains closed and the auxiliary switch 3 remains open during the normal operation of the motor and until such time as it is desired to brake or decrease the speed of said motor. In the embodiment of FIG. 2, the main and auxiliary switches are replaced by a single changeover switch 23. The changeover switch is interposed and connected between the motor 1 and each of the converter 4 and the electrical power source R, S, T. The changeover switch 23 has a first selectable position in which it electrically connects the motor 1 to the converter 4 and disconnects said motor from the electrical power source R, S, T. The switch 23 has a second selectable position in which it electrically connects the induction motor 1 to the electrical power source R, S, T and disconnects said motor from the converter 4. FIG. 3 discloses a three-phase connection of the converter 4 to the source of electrical power. In the embodiment of FIG. 3, the neutral point of the three-phase connection has a circuit lead connected thereto. The converter 4 of FIG. 3 comprises a plurality of semiconductor controlled rectifiers 41. The semiconductor controlled rectifier 41 are also known as thyristors or bistable controlled devices and are manufactured by the General Electric Company under the name Triac.

A three-phase transformer 42 has Y-connected primary windings directly connected to corresponding ones of the lines R, S, T of the source of electrical power and secondary windings connected in Y arrangement. Each of the secondary windings is connected to a corresponding one of three leads 40a, 40b, 40c. The anode of each of semiconductor controlled rectifiers of each group of three of said rectifiers is connected to a corresponding one of the leads 40a, 40b and 40c.

The anodes of the semiconductor controlled rectifiers of each group of said rectifiers are connected in common and the common connected cathodes of each group of said rectifiers are connected to corresponding ones of the leads x, y, z, which are the same as the similarly identified leads of FIG. 1. The leads x, y, z are connected to the induction motor 1 via the auxiliary switch 2.

The neutral point of the secondary windings of the transformer 42 is connected to the neutral point of the induction motor 1 via a DC circuit comprising a choke coil 43, a current sensor such as, for example, an ammeter, and a high speed circuit braker 45. The DC circuit is of single phase type and may be either symmetrical or asymmetrical. If the connection is symmetrical, the neutral point of the transformer winding is without a lead.

An advantage of the control circuit of the present invention is that final braking and run-out to a desired position of the motor are provided at relatively low cost. The output of the converter during dynamic braking and during the run-out with the assistance of the variable frequency voltage practically amounts to several percent of the nominal output of the induction motor. The control circuit of the present invention is preferably utilized for high voltage motors or machines because operation at low frequencies requires a lower voltage. The control circuit of the present invention may also be utilized particularly with hoisting machines in mines and may be utilized in driving equipment for rolling mill plants.

Figure 4:
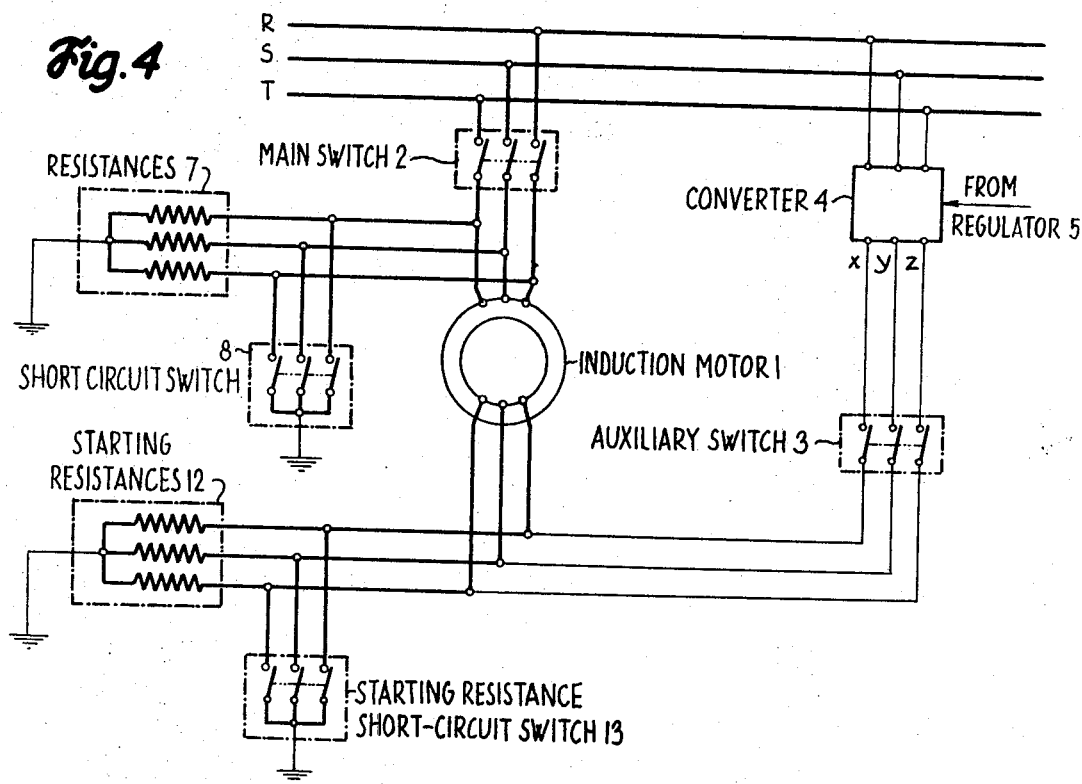
FIG. 4 is a circuit diagram illustrating the connection of the converter to the rotor winding of the motor.

FIG. 4 illustrates the connection of the converter 14 to the rotor winding of the induction motor 1 via the auxiliary switch 3. In FIG. 4, the dynamic braking resistances 7 are connected to the stator winding of the induction motor 1. Starting resistances 12 are connected between the rotor winding of the induction motor 1 and ground. After the motor 1 has started and has reached operating speed, a starting resistance short-circuit switch 13, which is connected to the starting resistances 12, is closed and short-circuits said starting resistances to ground thereby disconnecting them from the circuit.

While the invention has been described by means of specific examples and in specific embodiments, we do not wish to be limited thereto, for obvious modifications will occur to those skilled in the art without departing from the spirit and scope of the invention.

What we claim is:

1. A control circuit for braking speed control of an induction motor having a rotor and a stator winding, said control circuit comprising:
   a main switch;
   a constant frequency source of electrical power connected to the stator winding of said motor via said main switch;
   an auxiliary switch operated with said main switch;
   converter means connecting said electrical power source to the stator winding of said motor via said auxiliary switch for applying to said motor a variable voltage from direct voltage to an alternating voltage of variable frequency;
   regulating means comprising DC regulating means and frequency regulating means for regulating direct and alternating voltages to specific reference levels; and
   control means connected to said converter means via said regulating means and controlling said converter means in accordance with specific operating conditions of said motor to apply direct voltage to the stator winding of said motor to brake said motor when it is operating at high speed and to apply a variable frequency voltage to said stator winding to brake said motor when it is operating at low speed.

2. A control circuit as claimed in claim 1, further comprising changeover switch means interposed and connected between said motor and each of said converter means and electrical power source, said changeover switch means having a first selectable position in which it electrically connects said motor to said converter means and disconnects said motor from said electrical power source and a second selectable position in which it electrically connects said motor to said electrical power source and disconnects said motor from said converter means.

3. A control circuit as claimed in claim 1, further comprising electrical resistance means connected to the rotor winding of said motor for dynamically braking said motor and short-circuit switch means connected to said resistance means and connected to and controlled by said control means to selectively connect and disconnect said resistance means to and from said motor.

4. A control circuit as claimed in claim 1, further comprising speed sensing means coupled to said motor and electrically connected to said control means for controlling the operation of said regulating means in accordance with the speed of said motor.

5. A control circuit as claimed in claim 1, further comprising position sensing means coupled to said motor and electrically connected to said control means for controlling the operation of said regulating means in accordance with the position of the rotor of said motor.

6. A control circuit as claimed in claim 1, wherein said regulating means comprises current regulating means having an output connected to said converter means and a pair of inputs, a source of reference current having an output connected to an input of said current regulating means and a plurality of inputs, current sensing means connected to the other input of said current regulating means for supplying a signal corresponding to the current supplied to said converter means, one of the inputs of said reference current source being connected to said control means.

7. A control circuit as claimed in claim 3, further comprising main switch control means for controlling the position of said main switch, auxiliary switch control means for controlling the position of said auxiliary switch and short-circuit switch control means for controlling the position of said short-circuit switch means, and wherein said control means has a plurality of outputs each connected to a corresponding one of said main switch control means, said auxiliary switch control means and said short-circuit switch control means for controlling said main switch, said auxiliary switch and said short-circuit switch in position.

8. A control circuit as claimed in claim 6, further comprising position sensing means coupled to said motor and electrically connected to said control circuit and to another input of the reference current source of said regulating means for controlling the operation of said regulating means in accordance with the position of the rotor of said motor and speed sensing means coupled to said motor and electrically connected to said control means and to still another input of the reference current source of said regulating means for controlling the operation of said regulating means in accordance with the speed of said motor.

References Cited

UNITED STATES PATENTS

| 2,637,007 | 4/1953 | Picking et al. | 318—212 |
| 2,996,648 | 8/1961 | Bohn | 318—212 |

ORIS L. RADER, Primary Examiner

K. L. CROSSON, Assistant Examiner

U.S. Cl. X.R.

318—380